US012632530B2

(12) United States Patent　　　　(10) Patent No.: US 12,632,530 B2
Vacek　　　　　　　　　　　　　　　 (45) Date of Patent: May 19, 2026

(54) METHOD FOR SECURING A BIOMETRIC RECOGNITION OF A USER

(71) Applicant: THALES DIS FRANCE SAS, Meudon (FR)

(72) Inventor: Jan Vacek, Prague (CZ)

(73) Assignee: THALES DIS FRANCE SAS, Meudon (FR)

( * ) Notice: Subject to any disclaimer, the term of this patent is extended or adjusted under 35 U.S.C. 154(b) by 65 days.

(21) Appl. No.: 18/856,678

(22) PCT Filed: Apr. 3, 2023

(86) PCT No.: PCT/EP2023/058688

§ 371 (c)(1),
(2) Date: Oct. 14, 2024

(87) PCT Pub. No.: WO2023/198495

PCT Pub. Date: Oct. 19, 2023

(65) Prior Publication Data

US 2025/0258898 A1　　　Aug. 14, 2025

(30) Foreign Application Priority Data

Apr. 14, 2022　　(EP) ..................................... 22305557

(51) Int. Cl.
*G06F 21/32*　　　　　(2013.01)
*H04L 9/32*　　　　　 (2006.01)

(52) U.S. Cl.
CPC ..................................... *G06F 21/32* (2013.01)

(58) Field of Classification Search
CPC ........ H04L 9/085; H04L 9/3231; G06F 21/32
See application file for complete search history.

(56) References Cited

U.S. PATENT DOCUMENTS 9,935,947 B1 *　4/2018　Machani ............. H04L 63/0861
10,452,826 B2 *　10/2019　Rush ..................... G06V 40/172
(Continued)

FOREIGN PATENT DOCUMENTS

WO　　20210167534 A1　　8/2021

OTHER PUBLICATIONS

International Search Report (PCT/ISA/220) and Written Opinion (PCT/ISA/237) mailed on Jun. 30, 2023, by the European Patent Office as the International Searching Authority for current International Application No. PCT/EP2023/058688 [14 pages].
(Continued)

*Primary Examiner* — Gary S Gracia

(57)　　　　　　ABSTRACT

Provided is a method for securing a biometric recognition of a user to be recognized against one or more templates and a non zero integer, corresponding to registered users identities, using a biometric sample of said user, in a biometric recognition system comprising a plurality of computation devices, a global scoring computation device and a recognition device. Each of said templates is split, using an additive splitting modulo a predetermined integer N, into a plurality of template shares stored in said computation devices, with i in [0, n−1] and n a non zero integer. A global scoring is computed for said at least one template by combining said shares of the global scoring computed for said template by said plurality of computation devices according to a formula. Other embodiments disclosed.

10 Claims, 2 Drawing Sheets

(56)                   References Cited

U.S. PATENT DOCUMENTS

| | | | | |
|---|---|---|---|---|
| 11,223,478 | B2* | 1/2022 | Eldefrawy | H04L 9/0861 |
| 11,991,282 | B2* | 5/2024 | Nagaraja | H04L 9/0866 |
| 11,995,884 | B1* | 5/2024 | Sammoura | G06V 10/955 |
| 12,474,231 | B2* | 11/2025 | Taghavi | G06T 3/4015 |
| 2009/0161924 | A1* | 6/2009 | Lu | G06V 40/12 |
| | | | | 382/124 |
| 2012/0204035 | A1* | 8/2012 | Camenisch | G06F 21/32 |
| | | | | 713/186 |
| 2016/0148039 | A1* | 5/2016 | Potash | H04L 63/0861 |
| | | | | 382/119 |
| 2017/0134375 | A1* | 5/2017 | Wagner | H04L 63/0853 |
| 2017/0324736 | A1* | 11/2017 | Connell, II | G06F 21/32 |
| 2018/0129797 | A1* | 5/2018 | Rush | G10L 17/00 |
| 2018/0137382 | A1* | 5/2018 | Nowak | H04L 63/00 |
| 2018/0144176 | A1* | 5/2018 | Ji | G06V 40/50 |
| 2020/0184191 | A1* | 6/2020 | Thompson | G06V 40/1365 |
| 2021/0014063 | A1* | 1/2021 | Arora | H04L 9/008 |
| 2021/0336792 | A1* | 10/2021 | Agrawal | H04L 9/30 |
| 2023/0017234 | A1* | 1/2023 | Soryal | H04L 67/1097 |
| 2023/0050481 | A1* | 2/2023 | Nagaraja | H04L 9/0897 |
| 2023/0084897 | A1* | 3/2023 | Ryoo | G06Q 20/382 |
| | | | | 705/44 |
| 2024/0143717 | A1* | 5/2024 | Baek | G06F 21/32 |
| 2025/0258898 | A1* | 8/2025 | Vacek | G06F 21/32 |
| 2026/0038647 | A1* | 2/2026 | Madani Tonekaboni | |
| | | | | G16C 20/70 |

OTHER PUBLICATIONS

XP055291441—Jun. 11, 2014—Julien Bringer et al Relevant to .Abstrat, Section 1.3, Section 2.3, 2.4, Section 3.3.

XP061041646—Nov. 4, 2020—Jia-Chng Loh et al Relevant to abstract.

* cited by examiner

METHOD FOR SECURING A BIOMETRIC RECOGNITION OF A USER

FIELD OF THE INVENTION

The present invention relates to the field of biometric recognition, and more particularly to a method and system for a secure biometric recognition preventing an attacker from gaining biometric information about the users registered to the system from biometric templates of such users.

BACKGROUND OF THE INVENTION

Biometric recognition is a reliable and widespread recognition method used in various systems from access control systems to bank cards. In such systems, in order to identify or authenticate a user, a biometric sample of the user to be recognized is acquired and compared to reference biometric profiles, called templates, of known users. Therefore a system performing such an identification or authentication usually stores a database of templates of all the users who have registered to the system and can be recognized by it.

The data stored in such a database are private identification data of the users such as fingerprints, voice recordings, face images retinal images. Therefore such data is very sensitive data, and must be protected against any unauthorized by an attacker who could reuse it for a fraudulent purpose.

In order to protect such data, such databases are often encrypted in order to prevent any reuse of the private data stored in the database in case an attacker would be able to get a read access to the database.

Nevertheless, such an encryption is not sufficient. In order to exploit the private data stored in the database, the recognition system usually stores a decryption key enabling it to decipher the private data when access to it is required, for performing a comparison to a biometric sample of a user to be recognized. Therefore, an attacker having access to the encrypted content of the database may also be able to retrieve, from a memory of the recognition system, this decryption key and to obtain a plaintext version of the private data stored in it. In addition, when the recognition system deciphers some private data before making a comparison to a biometric sample, the plaintext version of these private data is temporarily stored in a memory of the recognition system. Therefore, an attacker having access to the content of this memory, such as in a whitebox context, may be able to read on-the-fly this plaintext version of these private data.

Consequently, there is a need for a recognition method and associated device enabling to perform a user recognition against registered users templates without exposing any information about these registered users, even to an attacker who would have a complete access to the memory of the recognition device according to the invention.

SUMMARY OF THE INVENTION

For this purpose and according to a first aspect, this invention therefore relates to a method for securing a biometric recognition of a user to be recognized against one or more templates $T^j$, with j in [0, J−1] and J a non zero integer, corresponding to registered users identities, using a biometric sample of said user, in a biometric recognition system comprising a plurality of computation devices, a global scoring computation device and a recognition device, wherein each of said templates is split, using an additive splitting modulo a predetermined integer N, into a plurality of template shares $T_i^j$ stored in said computation devices, with i in [0, n−1] and n a non zero integer, said method comprising, for said at least one template $T^j$:

by each computation device:
  receiving said biometric sample P of the user to be recognized,
  for each template share $$T_i^j$$

of said template stored by said computation device, computing a share of a global scoring $$S_i(T_i^j, P)$$

by computing a similarity between said stored template share and the received biometric sample P,
  by said global scoring computation device, computing a global scoring for said at least one template by combining said shares of the global scoring computed for said template by said plurality of computation devices according to the formula:

$$(T^j, P) = \bigoplus_{i=0}^{n-1} S_i(T_i^j, P) \bmod N,$$

by said recognition device, recognizing said user to be recognized based on said global scorings computed for said at least one template.

Such a method enables to recognize a user by comparing a biometric sample to a set of templates such that neither the knowledge by an attacker of a template share nor the knowledge of any share of global scoring gives any information to the attacker about the registered user corresponding to this template.

Said biometric recognition may comprise a recognition of a physiological characteristic of the user among a face, an iris, a fingerprint, a hand geometry, a voice pattern, a retinal pattern.

The biometric sample of the user may be among a picture of the user, a photo, a handwriting, speech, a fingerprint sample.

In an embodiment, the step of computing a similarity between said stored template share and the received biometric sample P may comprise computing a cosine distance between the stored template share and the received biometric sample.

As an example, the user may be recognized by sorting global scorings computed for said at least one template and by selecting an identity corresponding to a template among said plurality of templates based on the sorted global scorings. In this example, the method according to the first aspect may comprise selecting an identity corresponding to the template having the highest global scoring.

It enables to assign to the user to be recognized the registered user identity which better matches the biometric sample of the user According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to biometric recognition system comprising a plurality of computation devices, a global scoring computation device and a recognition device, said system being configured to perform a method for securing a biometric recognition of a user to be recognized against one or more templates $T^j$, with j in [0, J–1] and J a non zero integer, corresponding to registered users identities, using a biometric sample of said user, wherein each of said templates is split, using an additive splitting modulo a predetermined integer N, into a plurality of template shares $$T_i^j$$

stored in said computation devices, with i in [0, n–1] and n a non zero integer, and wherein, for said at least one template $T^j$:
  each computation device is configured for:
    receiving said biometric sample P of the user to be recognized,
    for each template share $$T_i^j$$

of said template stored by said computation device, computing a share of a global scoring $$S_i(T_i^j, P)$$

by computing a similarity between said stored template share and the received biometric sample P.
  said global scoring computation device is configured for computing a global scoring for said at least one template by combining said shares of the global scoring computed for said template by said plurality of computation devices according to the formula:

$$(T^j, P) = \bigoplus_{i=0}^{n-1} S_i(T_i^j, P) \bmod N,$$

said recognition device is configured for recognizing said user to be recognized based on said global scorings computed for said at least one template.

According to a fourth aspect, this invention therefore relates also to a computation device of the biometric recognition system according to the third aspect configured to be connected to a network and comprising a processor, a memory and an input-output interface.

According to a fifth aspect, this invention therefore relates also to a global scoring computation device of the biometric recognition system according to the third aspect configured to be connected to a network and comprising a processor, a memory and an input-output interface.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

The invention relates to a method for securing a biometric recognition of a user to be recognized by a biometric recognition system.

Such a biometric recognition may for example comprise a recognition of a physiological characteristic of the user among a face, an iris, a fingerprint, a hand geometry, a voice pattern or a retinal pattern.

Figure 1:
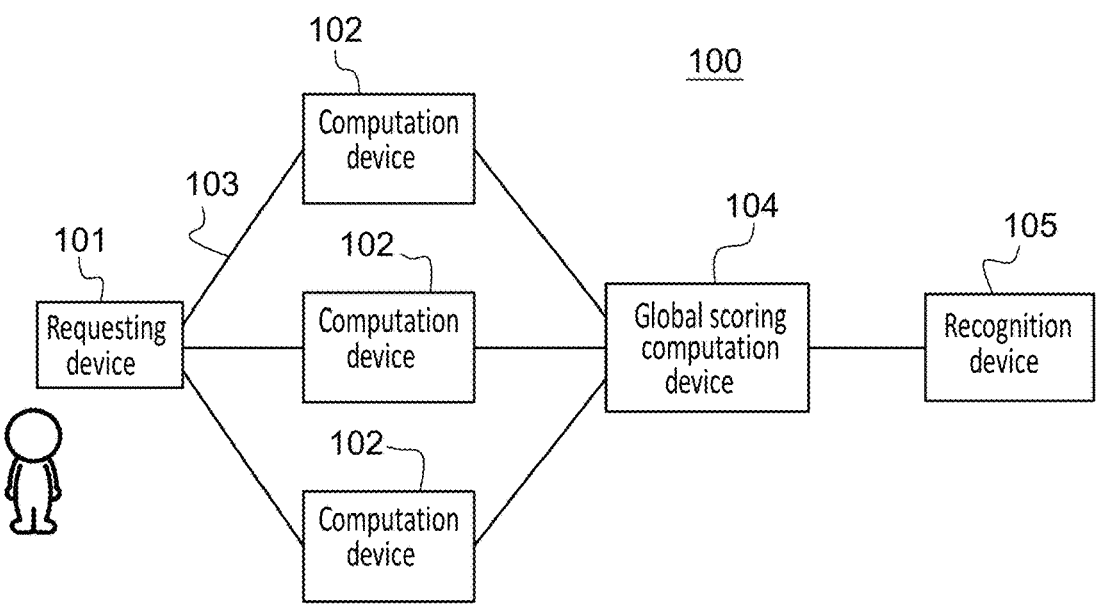
FIG. 1 is a schematic illustration of a system according to an embodiment of the present invention.

As shown on FIG. 1, the biometric recognition system 100 comprises a requesting device 101 in charge of acquiring or storing a biometric sample of the user to be recognized. Such a biometric sample may for example be a picture of the user, a photo, a handwriting, speech or a fingerprint sample.

Such a recognition is based on a comparison of such a biometric sample of the user to be recognized with a plurality of reference values corresponding to registered users identities, acquired prior to the recognition of the user. Such reference values will be called templates in the rest of the description. A template is a digital representation of a set of predefined essential features characterizing a reference biometric sample of a registered user. For example, in the case of a picture of a user such features may be distances between predetermined spots of the face such as the eyes. In an embodiment, it can be expressed as a vector of integers, of a predetermined length. As an example, such a template may usually include around 512 values. In order to enable a comparison, the biometric sample of the user to be recognized may be also expressed as an integer vector of the same length gathering the same predefined features.

The biometric recognition according to the invention may either be an identification or an authentication of the user to be recognized.

As an example, the method according to the invention may be used to authenticate a user for access control at the entrance of an area of restricted access, in order to check that the user to be recognized is a registered user that has appropriate credentials for accessing the restricted area. As another example, it can be used for identifying an individual during an identity control by law enforcement personnel or at a border gate, for checking if the user belongs to a list of wanted criminals.

In order to prevent any disclosure to an unauthorized party of information about the registered users, a first main idea of the invention is to avoid storing any complete template of such registered users in the biometric recognition system. Instead, as shown on FIG. 1, the biometric recognition system 100 may comprise a plurality of computation devices 102, connected by a network 103 to the requesting device; and each template may be split into several parts and said template parts storage may be distributed across the plurality of computation devices. In order to perform the biometric recognition of the user based on such distributed templates, the computation devices may participate to a multi-party computation: they may perform a comparison of the biometric sample of the user to be recognized with their shares of templates and then provide the results of their comparisons to a global scoring computation device 104 in charge of computing, for each template to which the biometric sample is compared, a global scoring indicative of the level of similarity between the biometric sample and the template.

The biometric recognition system may also comprise a recognition device 105, in charge of performing the final recognition of the user to be recognized based on the global scorings computed by the global scoring computation device for the biometric sample of the user to be recognized.

The requesting device, the computation devices, the global scoring computation device and the recognition device may all be separated devices, as shown on FIG. 1. Alternatively, a single device may play the role of two or more of these devices. For example, a single device may play the role of both the global scoring computation device and the recognition device; the requesting device may also play the role of one computation device or of the recognition device etc.

Such devices may for example be smart cards, mobile phones, tablets, personal computers or servers.

Figure 2:
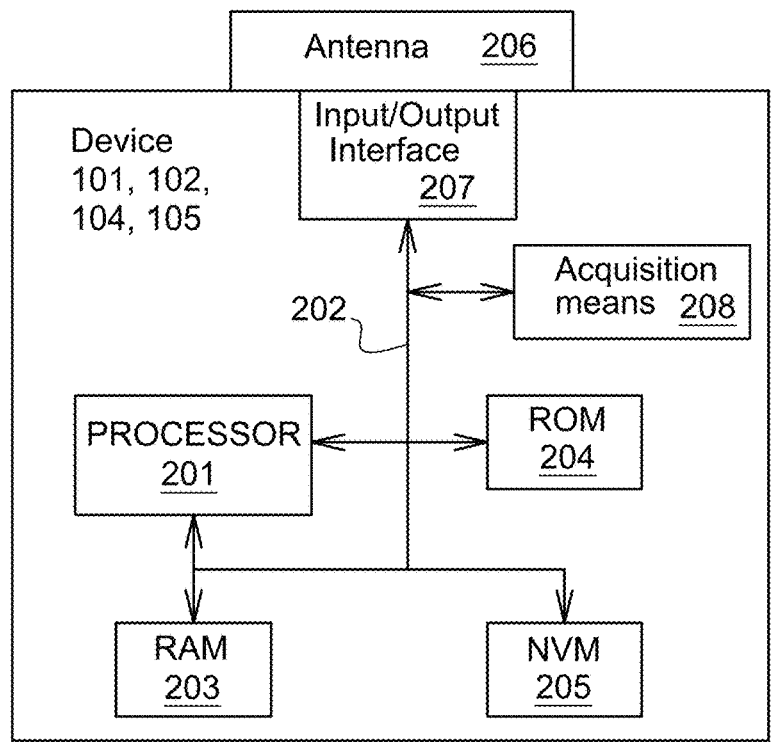
FIG. 2 is a schematic illustration of a device according to an embodiment of the present invention.

FIG. 2 is a schematic illustration of such devices 101, 102, 104 or 105. Such a device may include a processor 201 connected via a bus 202 to a random access memory (RAM) 203, a read-only memory (ROM) 204, and/or a non-volatile memory (NVM) 205. It may further include a communication interface 206. Such an interface may be used to connect the device to various forms of wireless networks, e.g., wide-area networks, WiFi networks, or mobile telephony networks. Alternatively, the device may connect to networks via wired network connections such as Ethernet. The device may also include an input/output interface 207 providing interfaces to the user of the device, such as one or more screens, loudspeakers, a mouse, tactile surfaces, a keyboard etc. In the case of the requesting device, it may also include acquisition means 208 of a biometric sample, such as a fingerprint scanner, a facial camera or voice recorder.

By doing such a splitting of the templates, no attacker can gain knowledge of a complete template unless he has access to the memories of all the computation devices storing shares of the template.

Nevertheless, information about the registered user corresponding to a template may still be leaked to an attacker having access to the memory of a single computation device if knowledge of a template share still provides information, at least partial, about the corresponding registered user. For example, in the case of a facial recognition system, a template would store features of minutiae of a face image of a registered user. A template share storing features of only the minutiae of a part of the user's face (left, right, low, top part . . . ) would not enable a reliable recognition but still gives some information about what the corresponding registered user looks like.

Therefore, a second main idea of the invention is to perform the splitting of the templates into a plurality of template shares stored in said computation devices using an additive splitting technique modulo a predetermined integer N. Assuming each template is noted $T^j$ with j in [0, J−1] and J a non zero integer equal to the number of templates stored in the biometric recognition system, each template $T^j$ may be shared into template shares $$T_i^j$$

with i in [0, n−1] and n a non zero integer equal to the number of shares of the template. In the case where the biometric sample of the user and the templates are integer vectors comprising a predefined number of elements, each element of the templates' vectors may be split into such shares using the additive splitting technique.

An example is given where each template is a vector of only four elements, for illustration purposes. In this example, each template $T^j$ is a vector $T^j=(t^j, u^j, v^j, w^j)$ and it is split into shares $$T_i^j = \left(t_i^j, u_i^j, v_i^j, w_i^j\right),$$

where $$t^j = \bigoplus_{i=0}^{n-1} t_i^j \bmod N, u^j = \bigoplus_{i=0}^{n-1} u_i^j \bmod N,$$

$$v^j = \bigoplus_{i=0}^{n-1} v_i^j \bmod N \text{ and } w^j = \bigoplus_{i=0}^{n-1} w_i^j \bmod N.$$

"$\oplus$" is the addition and "mod" is the modulo operation.

As usually done when using such a secret splitting technique, all shares but one of each template may be random values and the last share may be determined such that the sum of all shares has the right value:

$$T^j = \bigoplus_{i=0}^{n-1} T_i^j \bmod N.$$

By doing so, none of the shares of a template can be used in isolation to retrieve information about the registered user corresponding to this template. Information about the registered user may only be revealed by the combination of all the shares of a template. Similarly, any score of similarity between the biometric sample of a user to be recognized and a share of a template does not give any information, not even partial, about the level of similarity between the user to be recognized and the registered user corresponding to the template. Therefore, an attacker gaining access to the memory of a networking connected device won't gain any information from it regarding the registered users and the recognition of the user to be recognized.

The value of the predetermined integer N is selected in such a way that it does not distort the result during the modulo operation. It can be selected depending on the maximum value of the norm of the biometric sample vector. In order to reduce the size of the biometric sample vector and of the template vectors, and therefore the required size of N, all the vectors may be normalized by dividing all their elements by the norm of the vector. They may also be scaled by keeping only a predetermined number of the most significant bits of each of their elements. Such a scaling, when applied to a vector of floats enables to keep only a desired number of bits for each value of the vector. This number of bits can be selected as a tradeoff between the speed and the accuracy of the recognition.

Figure 3:
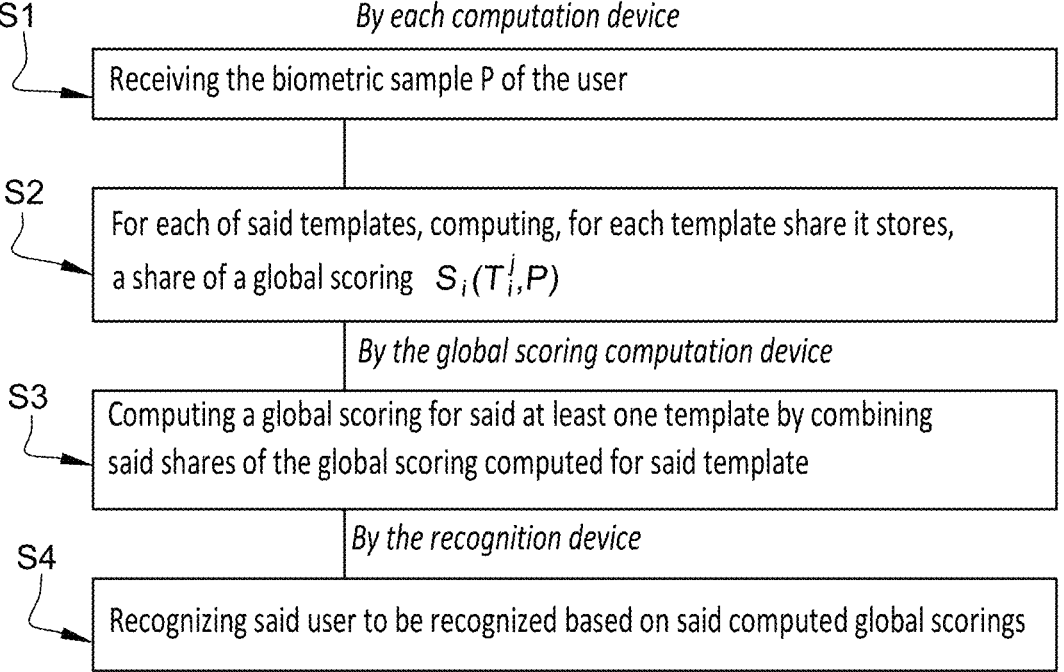
FIG. 3 illustrates schematically a method for securing a biometric recognition of a user against one or more templates corresponding to registered users identities, using a biometric sample of said user according to an embodiment of the present invention.

The following paragraphs describe the steps of the biometric recognition method according to the invention, as illustrated on FIG. 3. These steps describe the comparison of the biometric sample of a user to be recognized with at least one template $T^j$.

In a first step S1, each computation device receives the biometric sample P of the user to be recognized. The biometric sample may for example be broadcasted by the requesting device to all the computation devices after the requesting device acquired the biometric sample using its acquisition means. At this step, the biometric sample is preferably transferred after being transformed into the template format, as defined above, rather than as raw data from acquisition means.

For each template $T^j$ to which the biometric sample is to be compared, each computation device may store one or more template shares $$T_i^j$$

corresponding to the template $T^j$.

In a second step S2, for each of said templates, each computation device computes, for each template share it stores, a share of a global scoring $$S_i(T_i^j, P).$$

This global scoring share is obtained by computing a similarity between the stored template share and the received biometric sample.

As an example, when both the biometric sample and the template shares are integer vectors of a predetermined length, such a similarity computation may comprise the computation of a distance, such as a cosine distance, between the stored template share and the received biometric sample.

As an example, when these vectors comprise only four elements, for illustration purposes, and when the biometric sample is equal to P=(p, q, r, s) and a template share is equal to $$T_i^j = (t_i^j, u_i^j, v_i^j, w_i^j),$$

the global scoring share may be equal to $$S_i(T_i^j, P) = t_i^j \cdot p + u_i^j \cdot q + v_i^j \cdot r + w_i^j \cdot s \bmod N.$$

Since the biometric sample has not been split, each computation device is able to compute its global scoring share from its template share, independently of the other computation devices. No information exchange between the computation devices holding the template shares is required.

By doing so a similarity score is computed for all the template share of each share to which the biometric sample is to be compared. But at this stage, these global scoring shares still do not provide any information when considered independently since all the shares but one corresponding to a given template can be random values.

At the end of the second step S2, all these global scoring shares may be sent back by the connected network devices to the global scoring computation device.

In a third step S3, the global scoring computation device computes, for each of the templates to be compared with the biometric sample, a global scoring by combining the shares of the global scoring computed for this template by the plurality of computation devices according to the formula:

$$(T^j, P) = \bigoplus_{i=0}^{n-1} S_i(T_i^j, P) \bmod N.$$

The combination of all the global scoring shares using a modulo N operation enables to recover a meaningful score indicative of the degree of similarity between the user to be recognized and the registered user corresponding to the template, as if the original template had been used for computing the score. In order to achieve such a result, the same scoring function S may be used for computing a scoring for each template share. Such a scoring function S shall be distributive over the addition, such that $$S\left(\bigoplus_{i=0}^{n-1} T_i^j \bmod N, P\right) = \bigoplus_{i=0}^{n-1} S\left(T_i^j, P\right) \bmod N$$

At the end of the third step S3, the one or more global scorings computed for the biometric sample are transmitted to the recognition device.

In a fourth step S4, the recognition device recognizes the user to be recognized based on the computed global scorings. As described above, such a recognition may be an identification. In such a case, it can be done by sorting the computed global scorings and selecting an identity corresponding to a template based on the sorted global scorings. The higher the global scoring of a template is, the closer the biometric sample and the template are. Therefore, an identity corresponding to the template having the highest global scoring may be selected since it is the most likely to correspond accurately to the user to be recognized. In another example, such a recognition may be an authentication. In such a case, the recognition may verify that the computed global scoring associated to the template allegedly corresponding to the user to be recognized is above a predetermined authentication threshold.

According to a second aspect, the invention is also related to a computer program product directly loadable into the memory of at least one computer, comprising software code instructions for performing the steps of the method described here before when said product is run on the computer.

According to a third aspect, the invention is also related to a biometric recognition system 100 comprising a plurality of computation devices 102, a global scoring computation device 104 and a recognition device 105 described here before and configured to perform the steps S1 to S4.

According to a fourth aspect, the invention is also related to a computation device 102 of the biometric recognition system according to the third aspect, configured to be connected to a network 103 and comprising a processor 201, a memory 203, 204, 205 and an input-output interface 207 and described here before.

According to a fifth aspect, the invention is also related to a global scoring computation device 104 of the biometric recognition system according to the third aspect, configured to be connected to a network 103 and comprising a processor

201, a memory 203, 204, 205 and an input-output interface 207 and described here before.

In addition to these features, such computer program, devices and system may be configured for performing or may comprise any other features described here before.

As a result, such methods, devices and system enable to recognize a user by comparing a biometric sample to a set of templates such that neither the knowledge by an attacker of a template share nor the knowledge of the result of the comparison between such a share and the biometric sample of the user gives any information to the attacker about the registered user corresponding to this template

The invention claimed is:

1. A method comprising steps of:

securing a biometric recognition of a user to be recognized against one or more templates $T^j$, with j in [0, J−1] and J a non zero integer, corresponding to registered users identities;

using a biometric sample of said user, in a biometric recognition system comprising a plurality of computation devices, a global scoring computation device and a recognition device;

splitting each of said templates using an additive splitting modulo a predetermined integer N, into a plurality of template shares $$T_i^j$$

stored in said computation devices, with i in [0, n−1] and n a non zero integer, wherein, for said at least one template $T^j$:

by each computation device:

receiving (S1) said biometric sample P of the user to be recognized, for each template share $$T_i^j$$

of said template stored by said computation device, computing (S2) a share of a global scoring $$S_i(T_i^j, P)$$

by computing a similarity between said stored template share and the received biometric sample P, by said global scoring computation device, computing (S3) a global scoring for said at least one template by combining said shares of the global scoring computed for said template by said plurality of computation devices according to the formula:

$$(T^j, P) = \bigoplus_{i=0}^{n-1} S_i(T_i^j, P) \bmod N,$$

by said recognition device, recognizing (S4) said user to be recognized based on said global scorings computed for said at least one template.

2. The method of claim 1, wherein said biometric recognition comprises a recognition of a physiological characteristic of the user among a face, an iris, a fingerprint, a hand geometry, a voice pattern, a retinal pattern.

3. The method of claim 1, wherein the biometric sample of the user is among a picture of the user, a photo, a handwriting, speech, a fingerprint sample.

4. The method of claim 1 wherein computing a similarity between said stored template share and the received biometric sample P comprises computing a cosine distance between the stored template share and the received biometric sample.

5. The method of claim 1, wherein the user is recognized by sorting global scorings computed for said at least one template and by selecting an identity corresponding to a template among said plurality of templates based on the sorted global scorings.

6. The method of the previous claim 1, comprising selecting an identity corresponding to the template having the highest global scoring.

7. A computer program product directly loadable into the memory of at least one computer, comprising software code instructions for performing the steps below, when said product is run on the computer:

securing a biometric recognition of a user to be recognized against one or more templates $T^j$, with j in [0, J−1] and J a non zero integer, corresponding to registered users identities;

using a biometric sample of said user, in a biometric recognition system comprising a plurality of computation devices, a global scoring computation device and a recognition device;

splitting each of said templates using an additive splitting modulo a predetermined integer N, into a plurality of template shares $$T_i^j$$

stored in said computation devices, with i in [0, n−1] and n a non zero integer, wherein, for said at least one template $T^j$:

by each computation device:

receiving (S1) said biometric sample P of the user to be recognized, for each template share $$T_i^j$$

of said template stored by said computation device, computing (S2) a share of a global scoring $$S_i(T_i^j, P)$$

by computing a similarity between said stored template share and the received biometric sample P, by said global scoring computation device, computing (S3) a global scoring for said at least one template by combining said shares of the global scoring computed for said template by said plurality of computation devices according to the formula:

$$(T^j, P) = \bigoplus_{i=0}^{n-1} S_i(T_i^j, P) \bmod N,$$

by said recognition device, recognizing (S4) said user to be recognized based on said global scorings computed for said at least one template.

8. A biometric recognition system comprising a plurality of computation devices;

a global scoring computation device; and a recognition device (105), said system being configured for securing a biometric recognition of a user to be recognized against one or more templates $T^j$, with j in [0, J−1] and J a non zero integer, corresponding to registered users identities, using a biometric sample of said user, wherein each of said templates is split, using an additive splitting modulo a predetermined integer N, into a plurality of template shares $$T_i^j$$

stored in said computation devices, with i in [0, n−1] and n a non zero integer, and wherein, for said at least one template $T^j$:

each computation device is configured for:

receiving said biometric sample P of the user to be recognized, for each template share $$T_i^j$$

of said template stored by said computation device, computing a share of a global scoring $$S_i\left(T_i^j, P\right)$$

by computing a similarity between said stored template share and the received biometric sample P, said global scoring computation device is configured for computing a global scoring for said at least one template by combining said shares of the global scoring computed for said template by said plurality of computation devices according to the formula:

$$\left(T^j, P\right) = \bigoplus_{i=0}^{n-1} S_i\left(T_i^j, P\right) \bmod N,$$

said recognition device is configured for recognizing said user to be recognized based on said global scorings computed for said at least one template.

9. The biometric recognition system of claim 8, wherein the computation device is configured to be connected to a network and comprising a processor, a memory and an input-output interface.

10. The biometric recognition system of claim 8, wherein the global scoring computation device is configured to be connected to a network and comprising a processor, a memory and an input-output interface.

* * * * *